3,677,900
METHOD OF PRODUCING COLLAGENASE WITH A SPECIES OF VIBRIO
Joseph R. Merkel, Emmaus, Pa., assignor to Lehigh University, Bethlehem, Pa.
Filed May 4, 1970, Ser. No. 34,178
Int. Cl. C12d *13/10;* A61k *19/00*
U.S. Cl. 195—66 R                               23 Claims

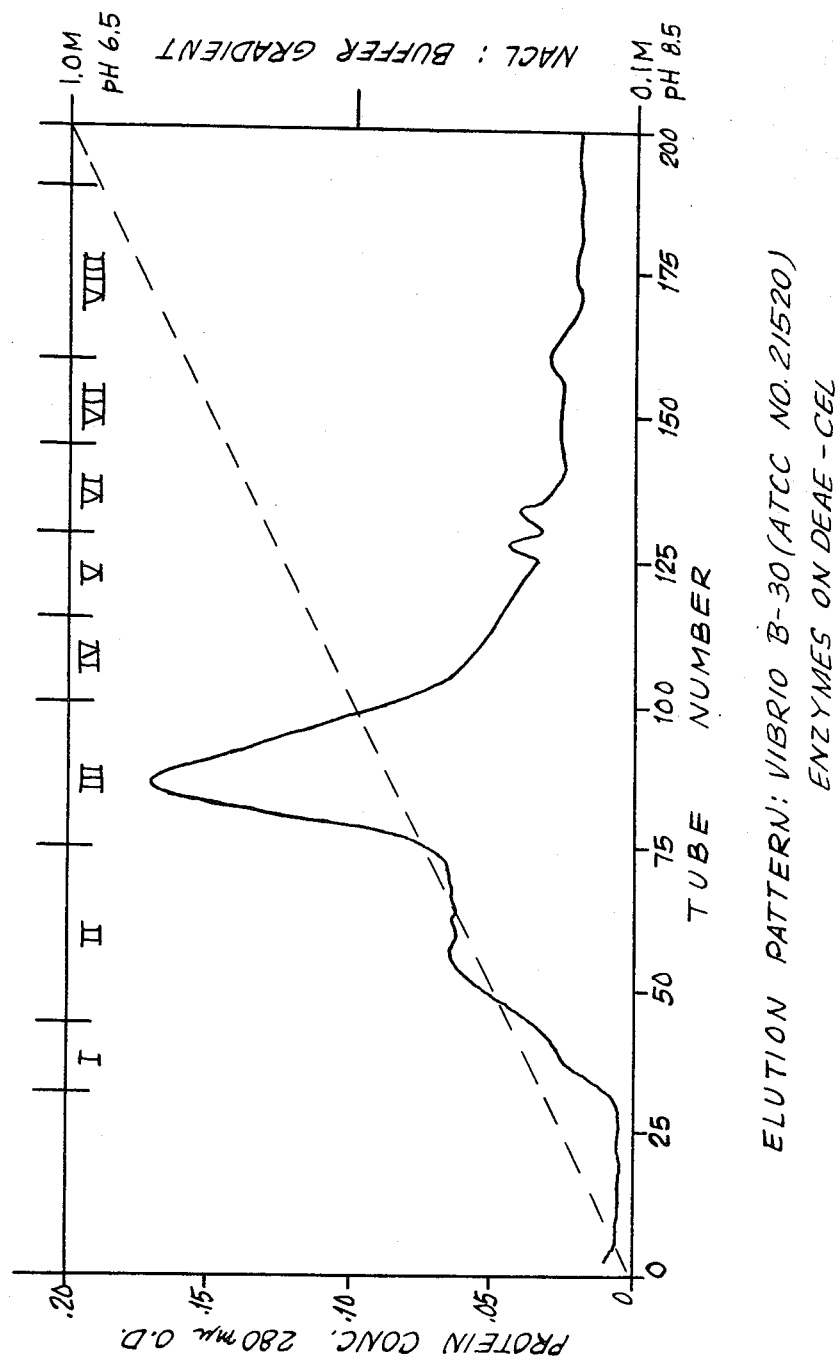

ABSTRACT OF THE DISCLOSURE

Collagenases or collagenolytic enzymes active against several preparations of Achilles tendon collagen, calfskin collagen and synthetic peptides which are normally attacked by *Clostridium histolyticum* collagenase are prepared by culturing certain marine bacteria, particularly species of Vibrio, Aeromonas and Pseudomonas.

---

The invention described herein was made in connection with work carried out under Contract No. Non-610(05) of the Department of the Navy, Office of Naval Research.

This invention relates to collagenases. More particularly this invention relates to a collagenase or collagenases produced by culturing marine bacteria, particularly facultative anaerobic species of the genera Vibrio, Aeromonas and Pseudomonas. Marine bacteria may be defined as those bacteria isolated from the sea water environment and which require sea water in the medium for growth of the initial isolate.

Collagenases by definition are enzymes capable of digesting native, undenatured collagen under physiological conditions of pH and temperature. True collagenases are believed to be very rare and until recently *C. histolyticum* was thought to be the only non-mammalian source of this type of ezyme. Collagenases have been produced by culturing anaerobic strains of *Clostridium* e.g. *C. histolyticum* or *C. welchii*, see particularly U.S. Pat. 3,201,325. The collagenase product recovered by culturing anaerobic strains of Clostridium under anaerobic conditions does not appear to be a particularly desirable collagenase product because of the danger of contamination with other materials, particularly the exotoxins normally associated with the anaerobic growth of strains of Clostridium. Additionally, the anaerobic culture of bacteria, even the normally anaerobic bacteria, such as the clostridia, is a somewhat difficult operation due to the necessity of preventing contact of the growth with air. Also, there is a potential health hazard to those handling the Clostridium cultures.

It is an object of this invention to provide a method for the production and recovery of collagenases.

It is another object of this invention to provide an improved collagenase product, such as a collagenase product produced by the aerobic culturing of marine bacteria in a suitable growth medium.

How these and other objects of this invention are achieved will become apparent in the light of the accompanying disclosure and with reference to the accompanying drawing which graphically illustrates the elution pattern of a collagenase prepared in accordance with this invention. In at least one embodiment of the practice of this invention as set forth in the accompanying disclosure at least one of the foregoing objects of this invention will be achieved.

It has been discovered that collagenases are produced by culturing certain facultative anaerobic species of marine bacteria selected from the genera Vibrio and Aeromonas and certain aerobic species of marine bacteria belonging to the genus Pseudomonas in presence of a nutrient culture medium therefor under aerobic conditions. The collagenases thus produced are readily separated from the culture medium by addition thereto of a protein-precipitating agent, such as ammonium sulfate, sodium sulfate, acetone or alcohol, and after fractionation for the removal of the non-collagenase components from the precipitated collagenase a substantially pure collagenase product is obtained.

The marine bacteria which have been found useful in the practice of this invention for the production and recovery of collagenase are species of the genera Vibrio, Aeromonas and Pseudmonas. Particularly useful species are the organisms of the genera Vibrio and Aeromonas particularly those which are identified hereinafter as Vibrio B–30, and marine bacterial isolates A. B–51, A. B–175, A. B–57, A. B–277, A. B–278, A. B–280, and certain of the aerobic species of the genus Pseudomonas herein designated P. B–2 and P. B–207. Also useful in the practice of this invention for the production and recovery of collagenases is the marine bacterium *Aeromonas proteolytica*. A description of this facultative aerobic bacterium is to be found in the Journal of Bacteriology, vol. 87, No. 5, pp. 1227–1233 (1964), in the article entitled "Proteolytic Activity and General Characteristics of a Marine Bacterium, Aeromonas Proteolytica Sp. N" by Joseph R. Merkel et al. The disclosures of this publication are herein incorporated and made part of this disclosure.

The above-identified organism Vibrio B–30 has been deposited in the American Type Culture Collection, Rockville, Maryland, under the identification number ATCC 21520.

The activity of the collagenases prepared in accordance with this invention has been demonstrated on an acid-extracted collagen medium prepared by the method of J. Gross and D. Kirk, see J. Biol. Chem. 233, 355–360 (1958), which was resistant to the hydrolytic action of trypsin, crude pancreatin, certain marine proteinases, hyaluronidase and chrondroitinase. This collagen medium or screen revealed that a number of marine bacterial isolates prepared and recovered in accordance with this invention possessed the ability to digest the reconstituted collagen medium. Further, the collagenases prepared and recovered in accordance with this invention have proved to be active against several preparations of Achilles tendon collagen and synthetic peptides which are normally attacked by *C. histolyticum* collagenase. The activity and the specificity of collagenases prepared in accordance with this invention were compared with the activity and specificity of collagenase produced and recovered by the anaerobic culturing of the *C. histolyticum* and were found to be similar in many respects.

The following is illustrative of the practices of this invention. An aqueous nutrient culturing medium comprising pancreatin digested casein and calfskin collagen is prepared. One liter of this culture medium is made up of 40 ml. of aqueous enzyme hydrolyzed casein which serves to provide the amino acids and peptides for initial growth of the bacteria. A suitable such hydrolysate is prepared according to the procedure of Williams, L. W. Hoff-Jorgensen, E. and Snell, E. E., J. Biol. Chem, 177, 933 (1949) modified by J. M. Prescott. This pancreatin hydrolyzed casein preparation is obtained by suspending 200 g. of "purified" or "vitamin-free" grade of casein in 2 liters of 0.8% $NaHCO_3$ adjusted to pH 8.0 with KOH and HCl. Pancreatin (3 X USP) in the amount 1.11 g. dissolved in 20 ml. water is then added. The mixture is then incubated with continuous stirring for 48 hours at 37° C. under a layer of toluene. The pH is periodically adjusted to 8.0 by the addition of KOH. The resulting digest is then filtered through diatomaceous earth and the filtrate diluted to 2.4 liters. One ml. of this solution is equivalent to 50 mg. of casein. The solution is then stored under toluene at 2–5° C. until needed.

One liter of the culture medium also includes 400 ml. of 1:4 dilution of acid-solubilized calfskin prepared in accordance with the method of Gross and Kirk, Journal of Biological Chemistry, vol. 233, pages 356 (1958) but using all of the soluble calfskin that could be squeezed through cheesecloth. There is also included, to make up one liter volume, 560 ml. of synthetic or natural sea water, preferably adjusted to a pH of about 6.8–7.5.

The culture medium having the above-described composition, after sterilization, is inoculated with a collagenase-producing bacterium in accordance with this invention, e.g. Vibrio B–30, in the proportion of about 50 ml. of inoculum, usually containing about $10^9$–$10^{12}$ cells per ml., to 5 liters of the above-described culture medium.

During growth of the bacterium in the culture medium the temperature of the culture medium is maintained at about 23–25° C. and during growth the culture medium is aerated, such as by introducing air or equivalent oxygen-containing gas thereinto, preferably in the manner and/or location to effect thorough contact of the liquid culture medium with the oxygen-containing gas. Desirably, a foam-destroying device is included in the apparatus or an antifoam agent is included in the culture medium during culturing of the bacteria. Under the aforesaid conditions a period of about 18–24 hours is normally required for full growth.

A preparation which is virtually free of other proteinases can also be obtained by adjusting the pH of the medium to 8.0 and maintaining the pH between 8.0 and 8.6 during the 18–24 hour growth period by adding sterile acid or base as needed. The total yield of material is lower than that obtained in a fermentation where the medium is initially adjusted to a pH 6.8–7.5 and allowed to rise to 8.0–8.5 during the growth period.

After the bacteria in the culture medium had reached full growth the culture medium is treated, such as by filtration or centrifugation, to separate the bacteria from the aqueous culture medium which is collected and maintained at a relatively low temperature, such as 0–5° C.

The substantially cell-free or bacteria-free aqueous collagenase-containing medium is then treated by the addition of a protein-precipitating agent, such as ammonium sulfate, sodium sulfate, acetone or alcohol, to precipitate the collagenase. In this operation, for example, ammonium sulfate in an amount sufficient to achieve about 70% saturation of the aqueous collagenase-containing medium is added at a temperature in the range 2–5° C. The resulting mixture, now containing precipitated collagenase, is permitted to stand or remain quiescent for a period of time, such as 1–5 days, to promote the settling of the precipitated collagenase. The aqueous supernatant liquid is siphoned off or decanted and the precipitated collagenase separated from the remaining liquid by centrifugation or filtration. The recovered collagenase is then dissolved in 1% NaCl solution, subjected to fine filtration to separate any remaining bacteria. The resulting crude collagenase, in an aqueous solution, preferentially containing sufficient salts to enhance the enzyme stability, may be employed as such in an operation involving the use of collagenase or, if desired, the collagenase may be recovered therefrom by a suitable technique, such as lyophilization.

If a more pure collagenase product is desired the recovered precipitated collagenase dissolved in distilled water or dilute saline solution may be subjected to dialysis to remove excess salts and small molecules, such as pigments and peptides, and the resulting dialyzed solution then subjected to fine filtration for the removal of any remaining bacteria cells and then lyophilized. A substantially pure collagenase product may be obtained by further purification, such as by subjecting the dialyzed, filtered collagenase solution to ion exchange chromatography on DEAE cellulose and gel filtration on polydextran (Sephadex) and agarose columns.

The collagenases can be used in the lyophilized form or can be further purified by use of ion-exchange chromatography, such as on a DEAE-cellulose column (diethylaminoethyl-cellulose, a modified cellulose with anionic exchange properties). In a typical procedure 500 mg. of the dry lyophilized crude enzymes are dissolved in 20 ml. of distilled water, centrifuged to remove any solids and applied to the top of a 2.5 x 30 cm. column of DEAE-cellulose which had been regenerated and equilibrated with a solution which contained 0.02 M tris buffer, pH 8.5, plus 0.1 M NaCl. The enzymes, now absorbed to the DEAE-cellulose, are washed with 0.02 M Tris/0.1 M NaCl, pH 8.5 (~100 ml.). Then a linear, continuous, automatic concentration and pH gradient of buffer and salt solution is passed through the column. The gradient is achieved with 500 ml. of 0.02 M Tris/0.1 M NaCl at pH 8.5 at the start and 500 ml. of 0.02 M Tris/1.0 M NaCl, pH 6.5 at the end. Five ml. fractions of the eluant are automatically collected at the bottom of the DEAE-cellulose column. The flow rate through the column is 20–22 drops per minute. The elution pattern of a purified collagenase in accordance with this invention is graphically illustrated in the accompanying drawing.

The substantially pure collagenase prepared in accordance with the practice of this invention from species of marine bacteria of a genus of the group consisting of Vibrio aeromonas and Pseudomonas, specifically Vibrio. B–30, has a molecular weight in the range 100,000–200,000 as indicated by gel filtration. The collagenase upon electrophoresis at a pH of 8 rapidly moves toward the anode. In contrast the commercially available collagenase derived from the culturing of C. histolyticum moves slowly toward the cathode under similar conditions. It appears therefore that the collagenase produced in accordance with this invention possesses a relatively high negative charge at pH 8.0. Additionally, it was noted that the collagenase prepared in accordance with this invention is not inhibited by serum. Also, the collagenase is not activated by calcium ions as is the collagenase derived from a Clostridium bacterium species.

Referring again to the accompanying drawing of the elution pattern, at 280 m$\mu$ absorbance of collagenase prepared in accordance with this invention, the fraction marked III contained practically all of the collagenase activity and only a trace of non-specific proteinase activity. The tubes under the peak marked were pooled, concentrated 16-fold by ultrafiltration (Diaflo membrane filtration) and a small amount of the concentrate was subjected to polyacrylamide gel electrophoresis. Tests indicate the material recovered to be pure and homogeneous with respect to the collagenases.

The following example is illustrative of the practice of this invention applied to the preparation and isolation of Vibrio B–30 collagenase.

EXAMPLE

Preparation and isolation of Vibrio B–30 collagenase

Growth medium.—The following ingredients were added to a 7.5 liter glass fermentation tank:

200 ml. of pancreatin-hydrolyzed casein (each ml. contains the equivalent of 50 mg. of casein)
500 ml. of acetic acid solubilized calfskin (collagen)
86 g. of synthetic sea salts mixture (Rila Marine Mix, Rile Marine Products, Teaneck, N.J.)
4300 ml. distilled water The pH was adjusted to 7.0 with acetic acid and 2 N NaOH and the tank closed. The contents were sterilized by autoclaving at 15 pounds of pressure for 30 minutes.

After cooling the fermentor containing the medium was placed in a bath with the bath temperature set at 25° C.

Inoculum.—A 22 hr. shaker flask culture of Vibrio B–30 contained in 50 ml. of the above medium was used to inoculate the fermentor. The strain used had gone through 21 subcultures in the above medium before being used to prepare the inoculum.

Growth conditions.—After inoculation, 5 ml. of a silicone antifoam agent was aseptically added, the medium was stirred and compressed air at a pressure of 5–10 lbs./in.$^2$ was bubbled through the medium at a rate of 4–5 liters per minute. The temperature was controlled at 25° C. and incubation was continued for 22⅓ hours.

Separation of growth medium from bacteria.—The fermentor was removed from the bath and the bacteria were removed from the culture by continuous centrifugation in a refrigerated Lourdes Beta-fuge centrifuge operated at 0–5° C. and at a speed of 14,000 r.p.m. The clear culture filtrate was collected in a container immersed in a icebath. Approximately 4.2 liters of medium were recovered.

Collection of the enzyme.—2400 g. of crystalline ammonium sulfate was added to the culture filtrate and the enzymes were allowed to precipitate in a cold room at 2–5° C. over a period of 4 days after which time the major portion of the supernatant was removed by decantation and the enzymes were separated from the remaining medium by centrifugation. The enzymes thus collected were redissolved in 1% aqueous NaCl solution and were dialyzed overnight against 0.05 M Tris Buffer at pH 8.0.

After dialysis, the enzyme solution was lyophilized. 6.9 grams of dry material was obtained; 1 mg./ml. solution of this dry material had the following characteristics.

280 m$\mu$ absorbance—0.097
Assay according to Worthington Biochemical Corp. procedure=8.2 units/mg.
Endopeptidase activity as measured by the Anson Method and modified by Prescott and Willms*=0.007 units/mg.
Zone of reconstituted collagen digestion (3 drops of a 10 mg./ml. soln. applied to and antibiotic assay disc.) =4 mm.

The properties of Vibrio B–30 employed in the manufacture of the collagenase are:

Gram Negative rod (0.7–0.8$\mu$ x 1.3–1.4$\mu$)
Motile (single polar flagellum)
Facultative aerobe: Oxidase and Catalase positive
Required sea water for initial isolation
H$_2$S not produced; Indole not prouced
Gelatin and other proteins hydrolyzed
Temperature optimum: 31–33C
Voges-Proskauer negative; Methyl red positive
Not inhibited by the Vibriostatic agent, 2,4-diamino-6,7-diisopropyl pteridine
Sensitive to chloramphenicol, novobiocin and tetracycline
Insensitive to streptomycin, neomycin and penicillin Carbohydrates utilized aerobically and anaerobically (acid but no gas): Glucose, Sucrose, Galactose, Salicin, Mannitose, Maltose, Cellobiose, Arabinose, Insulin, Ribose, Fructose, Mannose, Starch, Dextrin.

Carbohydrates not utilized: Lactose, Xylose, Dulcitol, Sorbose, Raffinose, Inositol, Adonitol, Mellibiose.

The collagenases prepared in accordance with this invention are useful for numerous industrial, biological and medical purposes. Specifically, the collagenases prepared in accordance with this invention are useful in the treatment of biological specimens for the removal of collagenous material therefrom to expose other portions of investigative interest. The collagenases prepared in accordance with this invention are also useful in the preparation of industrial products, particularly food products, such as sausage casings. Further, the collagenases prepared in accordance with this invention have medical utility, for example, are useful as debriding agents in the treatment of wounds and damaged tissue.

The collagenase prepared in accordance with this invention may be usefully applied-by applying the solid collagenase, usually preferably admixed with a suitable diluent or other suitable agent, directly to the collagen-containing substrate to be treated or altered. The collagenase may also be dissolved and/or dispersed in a suitable carrier, such as ointment, e.g. petrolatum, a solid carrier, e.g. inert powder, or aqueous solution, the selection of the carrier usually being dependent upon the intended use.

In the practice of this invention for the production of collagenase various techniques known to increase the productivity of the nutrient culture medium for culturing bacteria may be employed. For example, U.S. Patent 3,361,643 discloses that the production of microorganisms having exoenzyme-producing ability is improved by including in the culture medium phosphatidyl inositol. Further, U.S. Patent 3,133,001 discloses a technique for stabilizing enzyme products. The disclosures of these patents are herein incorporated and made part of this disclosure.

Although emphasis has been placed in this disclosure of the practice of the invention on the preparation of collagenase from the bacterium species Vibrio B–30, other Vibrio and Aeromonas species are useful, such as the above-identified A. B–51, A. B–175, A. B–57, A. B–277, A. B–278 and A. B–280. These Aeromonas and/or Vibrio species are cultured for the preparation of collagenase in the same manner as the above-described culturing of Vibrio B–30. Similarly, species of the genus Pseudomonas, such as the above-identified bacterium species P. B–2 and P. B–207, are cultured for the production and recovery of collagenase. The culturing method, the nutrient culture medium and the preparation techniques for the recovery of collagenase, all as described hereinabove, are generally applicable to the production of collagenase from the above-identified species of the genera Vibrio Aeromonas and Pseudomonas.

As will be apparent to those skilled in the art in the light of the foregoing disclosure, many modifications, alterations and substitutions are possible in the practice of this invention without departing from the spirit or scope thereof.

I claim:
1. A method of producing collagenase which comprises culturing bacteria of the species Vibrio ATCC No. 21520 in the presence of a nutrient culture medium under aerobic conditions and recovering collagenase from the resulting culture medium.

2. A method in accordance with claim 1 wherein the culture medium comprises natural or synthetic sea water.

3. A method in accordance with claim 1 wherein the pH of the culture medium is adjusted to a value in the range from about 6.8 to about 8.6.

4. A method in accordance with claim 1 wherein the pH of the culture medium is adjusted to a value in the range from about 6.8 to about 7.5.

5. A method in accordance with claim 1 wherein the pH of the culture medium is adjusted to a value in the range from about 8.0 to about 8.6.

6. A method in accordance with claim 1 wherein the temperature of the culture medium during culturing of the bacteria therein is maintained at a temperature in the range from about 20° C. to about 32° C.

7. A method in accordance with claim 1 wherein said culture medium comprises collagen.

8. A method in accordance with claim 1 wherein the culture medium comprises as nutrient a material selected from the group consisting of enzyme hydrolyzed casein, pancreatic autolyzate, soybroth, hydrolyzed cotton seed protein, proteose peptone and tryptone.

9. A method in accordance with claim 1 wherein said culture medium comprises an antifoam agent.

---

*Prescott, J. M. and Willms, C. R., Proc. Soc. Exptl. Biol. Med. vol. 103, 410 (1960).
Anson, M. L., J. Gen. Physiol. vol. 21, 79 (1938).

10. A method in accordance with claim 1 wherein the bacteria in said culture medium are separated therefrom at a temperature in the range from about 0° C. to about 25° C. prior to the recovery of the collagenase.

11. A method in accordance with claim 1 wherein in the recovery of collagenase from the resulting culture medium the bacteria are separated from the culture medium at a temperature in the range from about 0° C. to about 25° C. and the resulting substantially bacteria-free culture medium treated by addition to a protein precipitating agent to precipitate collagenase therefrom.

12. A method in accordance with claim 11 wherein the collagenase is precipitated from the substantially bacteria-free culture medium at a temperature in the range from about 0° C. to about 25° C.

13. A method in accordance with claim 11 wherein said protein-precipitating agent is selected from the group consisting of ammonium sulfate, sodium sulfate, acetone, ethyl and isopropyl alcohol.

14. A method in accordance with claim 11 wherein the resulting precipitated collagenase is separated, redissolved and subjected to filtration to separate any remaining bacteria cells therefrom.

15. A method in accordance with claim 11 wherein the resulting precipitated collagenase is separated, redissolved, the resulting solution dialyzed and subjected to filtration to separate any remaining bacteria cells.

16. A method in accordance with claim 15 wherein after filtration and dialysis the collagenase is precipitated from the resulting collagenase-containing solution by the addition of a protein-precipitating agent to precipitate collagenase therefrom.

17. A method in accordance with claim 15 wherein after filtration and dialysis the collagenase is recovered in solid form by lyophilization.

18. A method in accordance with claim 11 wherein the resulting precipitated collagenase is separated, redissolved, subjected to filtration and dialysis, the resulting filtered, dialyzed collagenase-containing solution treated with a protein-precipitating agent to precipitate collagenase therefrom and the resulting precipitated collagenase recovered.

19. A method in accordance with claim 1 wherein the recovered collagenase is lyophilized.

20. A method of producing a collagenase which comprises culturing bacteria of the species Vibrio ATCC No. 21520 in the presence of an aqueous nutrient culture medium therefor under aerobic conditions, said culture medium comprising collagen and hydrolyzed casein, the culture medium being adjusted to a pH in the range from about 6.8 to about 8.6, culturing said bacteria in the culture medium for a sufficient period of time and under conditions to permit full growth of the bacteria therein, separating bacteria from the resulting culture medium, treating the substantially bacteria-free culture medium to recover collagenase, dissolving the resulting recovered collagenase to form an aqueous solution thereof, fractionating the resulting collagenaseous-containing aqueous solution to remove substantially all of the non-collagenase components therefrom and recovering substantially pure collagenase.

21. A method in accordance with claim 20 wherein the fractionation of the resulting collagenase-containing aqueous solution to remove substantially all of the non-collagenase components therefrom includes ion exchange chromatography.

22. A method in accordance with claim 20 wherein the fractionation of the resulting collagenase-containing aqueous solution to remove substantially all of the non-collagenase components therefrom includes ion exchange chromatography on DEAE-cellulose and gel filtration.

23. A method in accordance with claim 20 wherein the fractionation of the resulting collagenase-containing aqueous solution to remove substantially all of the non-collagenase includes ion exchange chromatography on DEAE-cellulose and electrophoresis.

References Cited

Schoellmann et al., Biochim. Biophys, Acta (1966) pp. 557–559.

Merkel et al., Journal of Bacteriology vol. 87 No. 5, pp. 1227–1233 (1964).

Wilkes et al., Proc. Soc. Exp. Biol. Med. vol. 131, pp. 382–387 (1969).

LIONEL M. SHAPIRO, Primary Examiner

U.S. Cl. X.R.

195—6; 424—94; 99—176